No. 725,641. PATENTED APR. 14, 1903.
H. W. ASH.
APPARATUS FOR PREPARING MINERAL INGREDIENTS OF BITUMINOUS MACADAM OR OTHER PAVEMENTS FOR USE.
APPLICATION FILED APR. 25, 1902.
NO MODEL. 4 SHEETS—SHEET 1.

No. 725,641. PATENTED APR. 14, 1903.
H. W. ASH.
APPARATUS FOR PREPARING MINERAL INGREDIENTS OF BITUMINOUS MACADAM OR OTHER PAVEMENTS FOR USE.
APPLICATION FILED APR. 25, 1902.
NO MODEL. 4 SHEETS—SHEET 2.

No. 725,641. PATENTED APR. 14, 1903.
H. W. ASH.
APPARATUS FOR PREPARING MINERAL INGREDIENTS OF BITUMINOUS
MACADAM OR OTHER PAVEMENTS FOR USE.
APPLICATION FILED APR. 25, 1902.
NO MODEL. 4 SHEETS—SHEET 3.

No. 725,641. PATENTED APR. 14, 1903.
H. W. ASH.
APPARATUS FOR PREPARING MINERAL INGREDIENTS OF BITUMINOUS MACADAM OR OTHER PAVEMENTS FOR USE.
APPLICATION FILED APR. 25, 1902.
NO MODEL. 4 SHEETS—SHEET 4.
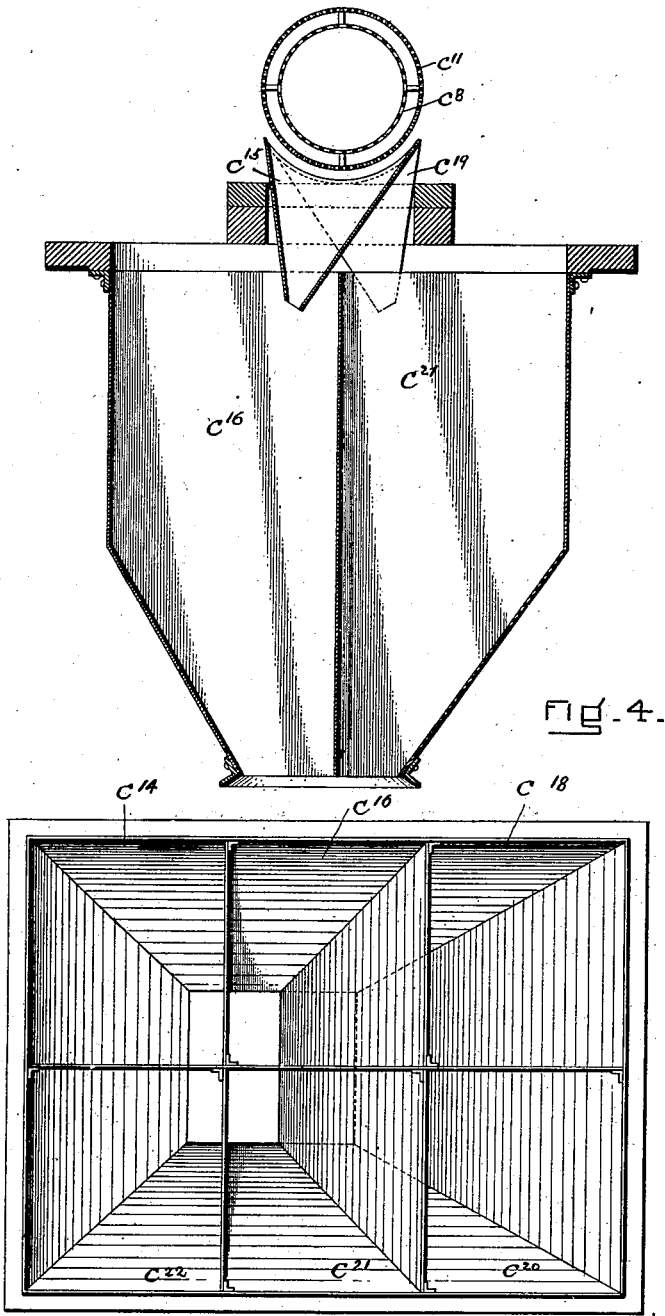

UNITED STATES PATENT OFFICE.

HORACE W. ASH, OF CAMBRIDGE, MASSACHUSETTS, ASSIGNOR TO WARREN BROTHERS COMPANY, OF BOSTON, MASSACHUSETTS, A CORPORATION OF WEST VIRGINIA.

APPARATUS FOR PREPARING MINERAL INGREDIENTS OF BITUMINOUS-MACADAM OR OTHER PAVEMENTS FOR USE.

SPECIFICATION forming part of Letters Patent No. 725,641, dated April 14, 1903.

Application filed April 25, 1902. Serial No. 104,585. (No model.)

*To all whom it may concern:*

Be it known that I, HORACE W. ASH, a citizen of the United States, and a resident of Cambridge, in the county of Middlesex and State of Massachusetts, have invented a new and useful Improvement in Apparatus for Preparing Mineral Ingredients of Bituminous-Macadam or other Pavements for Use, of which the following is a full, clear, and exact description, reference being had to the accompanying drawings, forming a part of this specification, in explaining its nature.

The invention relates to means for drying, screening, grading, and mixing the mineral ingredients or components of a pavement or roadway.

It comprises a rotary drying-drum, means for supplying it with heat, for feeding the mineral components automatically to it, for automatically supplying the components to an elevator, to a rotary screen for separating the ingredients into a number of sizes and to which they are automatically delivered by the elevator to bins beneath the screen for receiving and holding the various sizes, having separate means at their bottom for the delivering of each to devices for measuring the ingredients and for delivering them to a mixer, to a mixer, and means for delivering its contents.

In the manufacture of certain types of street-pavement or roadways it is necessary that the ingredients which enter into the composition of the sheet-wearing section of the roadway or pavement should be graded as to size, that the sizes should be proportioned to each other, and that they should then be combined with a given percentage or quantity of bituminous composition.

I will now describe the invention in detail in conjunction with the drawings forming a part of this specification, wherein—

Figure 1:
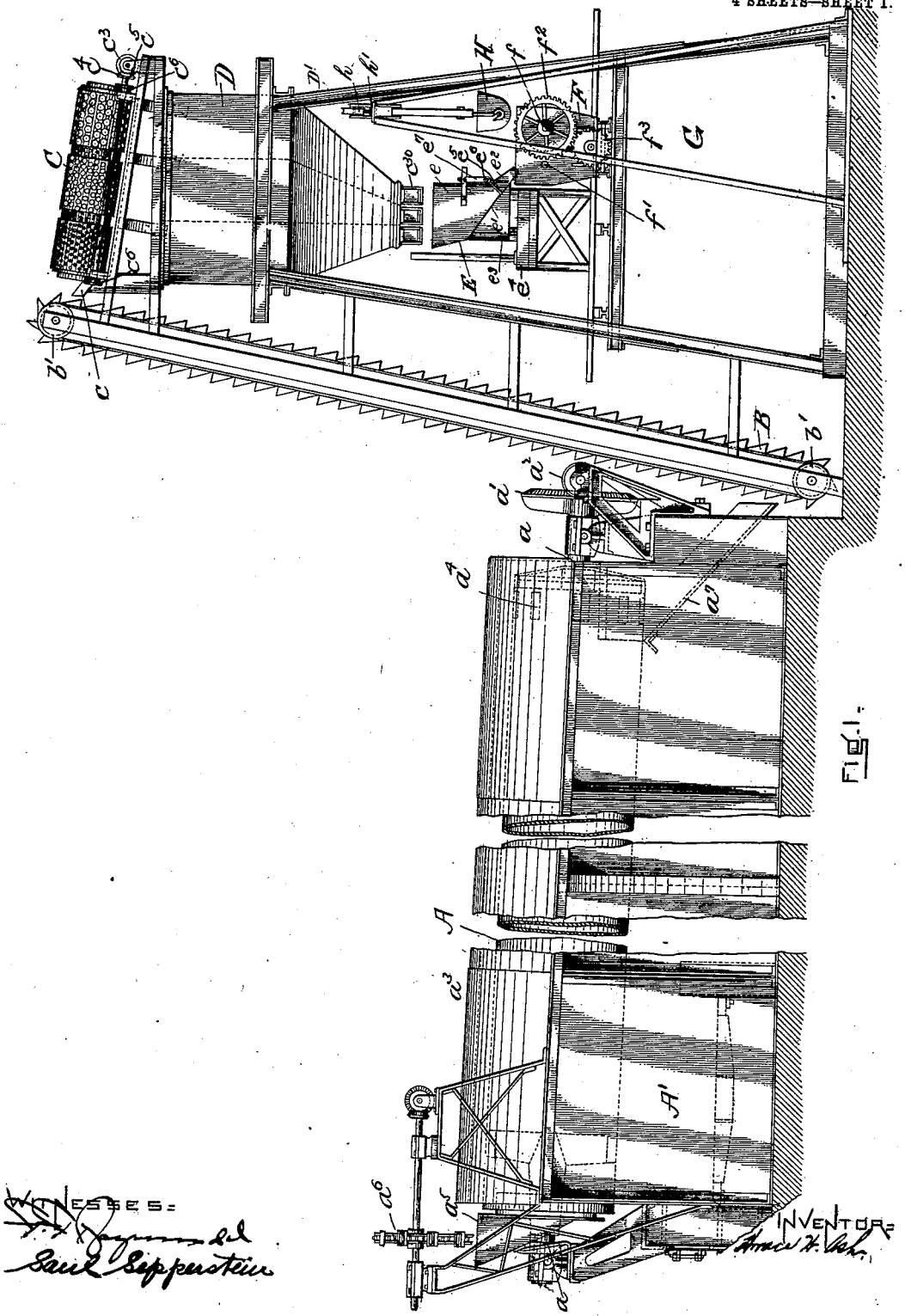
Figure 2:
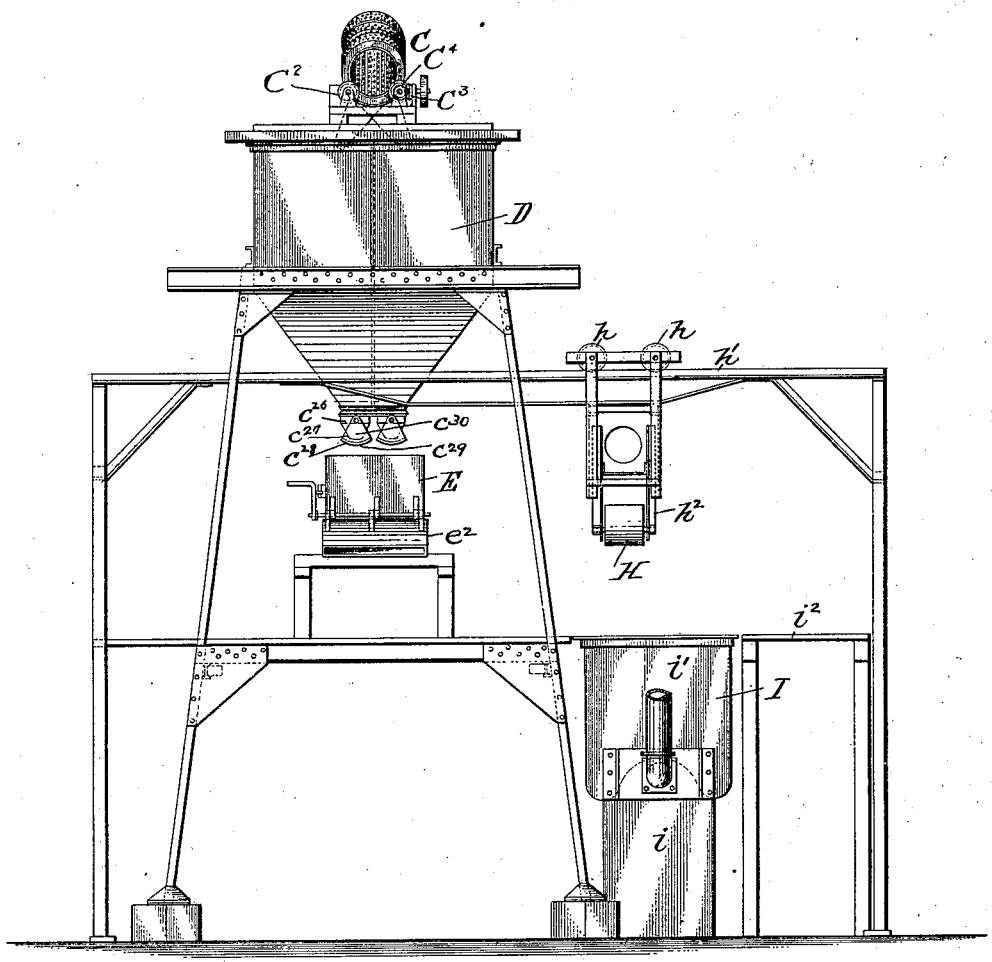
Figure 3:
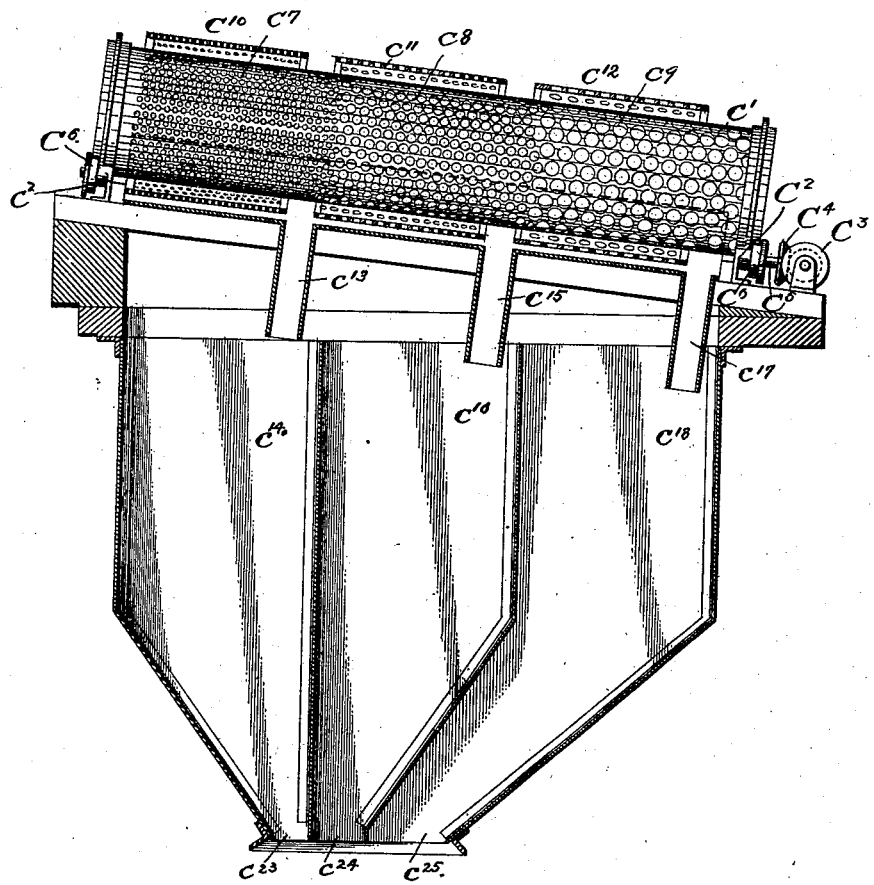

Figure 1 is a view in side elevation of the apparatus. Fig. 2 is a view in end elevation thereof. Fig. 3 is a view enlarged mainly in longitudinal vertical section to show the separating screens and bins. Fig. 4 is a view enlarged of the same parts in cross vertical section, and Fig. 5 is a view of the bins in plan.

Referring to the drawings, A represents a drum for drying the mineral ingredients. It is slightly inclined from its receiving to its delivery end, is mounted upon trunnions $a$, suitably supported in bearings, and is rotated by means of the bevel-gearing $a'$ $a^2$. The drum is inclosed in the casing or shell $a^3$, which opens from the furnace $A'$ and forms a heat-inclosing jacket to the drum and also a flue or means by which the products of combustion may circulate about the drum to its delivery end, where they enter the drum through the holes $a^4$ therein and are drawn through the drum to its receiving end, the drum thus being heated by the direct influence of the products of combustion exteriorly and interiorly. The receiving end of the drum has a hopper $a^5$ opening into its end and adapted to be supplied automatically by an elevator $a^6$ with the mineral ingredients, the elevator being of the usual type and being arranged to lift the ingredients from the ground or some receptacle and to deposit them automatically into the hopper. The mineral elements leave the drum through the holes $a^4$, and by means of the chute $a^7$, arranged below the end of the drum under the holes, are delivered automatically to the elevator B. This elevator is also of the usual type and is somewhat inclined from a vertical position and runs over the drums $b'$ $b'$, which are suitably supported. (See Fig. 1.) The drying-drum is slowly rotated, and the mineral elements fed to it are dried and heated as they pass through it and are automatically delivered in their heated condition to the elevator B. The elevator B delivers the heated ingredients at its upper end into the hopper $c$ of the grading-screen C. This screen is at a considerable height above the drying-drum and is so arranged in order to permit of the location below it of the grading-bins D, the combiner E, the mixer F, and head-room G for the automatic delivery of the contents of the mixer to carts or other conveyers adapted to be moved below it to convey the mixed material to the place where it is to be laid.

The mixing-screen C is of peculiar construction and is adapted to separate the mineral elements automatically into six grades and to deliver the grades into the six grading-bins. It comprises the shell $c'$, which is somewhat inclined from a horizontal position and is supported upon suitable bearings $c^2$ and is slowly rotated by means of the bevel-gear $c^3$ $c^4$ and shaft $c^5$, having pinions $c^6$ meshing with gears on the shell. The shell is perforated throughout; but the perforations are arranged in the divisions $c^7$ $c^8$ $c^9$, the smaller perforations being at the upper end, the intermediate at the center, and the larger perforations at the lower end. The shell is surrounded by the three jackets $c^{10}$, $c^{11}$, and $c^{12}$, which are attached to it to be rotated therewith and which surround, respectively, the perforated sections $c^7$ $c^8$ $c^9$. Each jacket is perforated, the jacket $c^{10}$ having smaller perforations than the section of the shell it surrounds and the same being true of the jackets $c^{11}$ and $c^{12}$. At the end of each jacket there is a chute which delivers the ingredients which pass from the shell upon the jackets, but which do not pass through the jackets, into individual bins for receiving and holding them. Thus the chute $c^{13}$ receives such ingredients from the jacket $c^{10}$ and delivers them to the bin $c^{14}$, the chute $c^{15}$ receives such ingredients from the jacket $c^{11}$ and delivers them to the bin $c^{16}$, and the chute $c^{17}$ receives such ingredients from the jacket $c^{12}$ and delivers them to the bin $c^{18}$. Under each jacket there is also a chute which receives the ingredients which pass the perforations thereof and delivers them to their appropriate bins. Thus the jacket $c^{10}$ has a chute $c^{19}$, which conveys said ingredients to the bin $c^{20}$. The jackets $c^{11}$ and $c^{12}$ have corresponding chutes, which deliver the ingredients, passing them respectively to the bins $c^{21}$ and $c^{22}$. There is thus obtained and held for use in the various bins mineral ingredients of six grades, and there is being delivered constantly and automatically to these bins ingredients of the same grades. The bins are arranged, it will be seen, in two lines side by side and are provided with direct outlets at their lower ends, which are brought together so as to be included in a space of small compass. The bin $c^{14}$ thus has the direct outlet $c^{23}$, the bin $c^{16}$ the outlet $c^{24}$, and the bin $c^{18}$ the outlet $c^{25}$, (see Fig. 3,) and the other bins, $c^{20}$ $c^{21}$ $c^{22}$, have corresponding direct outlets. Each bin has at its outlet a suspended nozzle $c^{26}$, through which its contents flow and which has an outlet $c^{27}$, which is slightly convex and which is closed by a valve $c^{28}$, having the curved closing-plate $c^{29}$, carried by hangers $c^{30}$, pivoted on each side of the nozzle. Each valve is adapted to be opened and closed by hand. The nozzles are so closely arranged as to deliver the contents of the bins into a combiner E of relatively small capacity, which is placed below the nozzles and which comprises a receptacle $e$, having an open top, walls, an inclined bottom $e'$, and chute $e^2$, opening from the lower end of the inclined bottom and extending outwardly and downwardly to deliver the contents of the combiner into the mixer F. I have shown the nozzles from six bins arranged side by side and in as close proximity as possible. This is very desirable in order that a weighing-receptacle of small cross area may be used to receive the contents of the bins. It is of course apparent that the smaller the cross area of the weighing-receptacle the easier it is to handle, and this is especially true where the weighing-receptacle must of necessity be of considerable size in order to be used economically with pavement-making material. This combiner is mounted upon the platform $e^3$ of the scale $e^4$. Only conventional scales are represented. The purpose of the scales is to determine by weight the quantity of each of the graded ingredients delivered by the bins to the combiner, and in use the weight of the combiner having been ascertained the quantity of each of the graded ingredients delivered to the combiner is then ascertained accurately by weight as the ingredients are delivered to the combiner. The ingredients are delivered from the combiner to the mixer F through the chute $e^2$. This chute is provided with a swinging gate $e^5$, pivoted at $e^6$ and closed or opened by the lever $e^7$.

The bins D support the framework upon which the screen C is mounted, and the bins themselves are made of sheet-iron and are supported by the framework D', comprising suitable inclined uprights and cross-bars. This framework also supports cross-bars, upon which the combiner and the scale are mounted and also the mixer F. The mixer is of the usual type, is open at its top, and has mixing-blades upon the shafts $f f'$, which are automatically turned by means of gears $f^2 f^3$. The mixer also is provided with a suitable gate, by means of which its bottom may be opened and closed, so as to dump the contents of the mixer with the least possible trouble. The mixer is arranged over the unobstructed space G within the framework and at a sufficient height from the base or the ground to permit its contents to be dumped into any carrying-receptacle, which may be driven or moved into the space below it. There is also mounted in operative relation to the mixer a bucket H, which is suspended from a trolley $h$, the rolls of which are mounted on the rail $h'$. The trolley and the bucket are movable crosswise and above the mixer and from a position over a heater I to a position over the mixer F. The heater I comprises a furnace $i$ and a suitable boiler $i'$, having an open top. It is located at one side of the frame, and its contents are adapted to be dipped out by an attendant standing on the platform $i^2$ into the bucket H when the bucket is above it. The bucket is mounted upon trunnions, whereby it may be tilted to empty its contents into the mixer. While ordinarily used to measure the amount of composition dipped out by the attendant by volume, it is preferably mounted upon a sliding frame $h^2$ in such a manner that its contents may be weighed, if thought best. Any suitable telescopic device may be used for providing the bucket with this means.

In operation the mineral ingredients having first been sorted to approximate the various grades and the quantities of the various grades are fed by an attendant to the elevator $a^6$, they then pass automatically through the heating and drying drum, are there heated to the desired temperature, and automatically delivered in their heated form to the elevator, by which they are elevated and delivered to the grading-screen. They are there automatically separated into the different grades. In the apparatus which I have shown there is provision for separation of the ingredients into six grades, and they are automatically delivered by the screens into the six receiving-bins D, into which they are run in their heated condition, but absolutely separated as to their sizes. They are then held "suspended," so to speak, in a position from which as much of either grade as may be desired for the purpose of making the composition required may be delivered automatically to the means for determining the proportion of each grade which is to be used—viz., the combiner and the scale. This determination of the proportions is done by hand. The graded ingredients thus selected as to their grades and as to their quantities are then fed to the mixer, where they are still hot and where they are combined with the heated bituminous composition which is fed to the mixer from the heater by the bucket, the bucket acting as a measuring means by which the amount of composition is adjusted to the quantity of the graded mineral ingredients, and the graded mineral ingredients are also thoroughly and uniformly mixed and combined with the heated bituminous composition and are then delivered in their heated, coated, and combined relation through the bottom of the mixer to a cart or conveyer, whereby they are caused to be transported to the place where the pavement or roadway is being constructed and where they are immediately combined by heavy pressure into a wearing-section of a sheet-pavement.

It will be understood that while a charge of different grades is being weighed and received by the combiner the mixer is mixing a previous charge received from the combiner with the bituminous composition; also, that the heating, conveying, and grading of the ingredients are simultaneously proceeding. Upon the delivery of a coated charge from the mixer a charge from the combiner is in readiness to be immediately delivered to the mixer. The invention, therefore, not only enables the accurate combining of the ingredients, but it also works a large economy in the handling and coating of them.

No claim is made in this case for the arrangement of the rotary screen and bins, as such forms the subject-matter of a separate application.

Having thus fully described my invention, I claim and desire to secure by Letters Patent of the United States—

1. The improved apparatus for preparing mineral ingredients of pavements comprising a rotary drying and heating drum, means for feeding the ingredients thereto and for automatically delivering them therefrom, a rotary grading-screen having an elevated position with regard to the drying and heating drum, an elevator for feeding the dried and heated ingredients from the drum to the screen, bins for receiving and holding the ingredients in their various grades, located below the screen, a discharge-gate for each bin, means below the bins for measuring the ingredients and delivering them to a mixer, and the said mixer.

2. In an apparatus for preparing mineral ingredients of pavements, the combination of a rotary grading-screen adapted to separate the ingredients into a number of sizes and to deliver them automatically into separate bins, said bins having outlets closely arranged and each of which is governed by an independent gate and a weighing or measuring receptacle below the outlets adapted to receive ingredients from all the bins and to measure or weigh them.

3. In an apparatus of the character specified, the combination of a number of grading-bins having outlets, a separate gate for each outlet and a weighing or measuring receptacle located to receive the ingredients from each outlet and having a gate, and a mixer, said weighing or measuring receptacle having a slanting floor and a chute the floor of which forms a continuation thereof and extends beyond the side of the receptacle, said weighing-receptacle gate being located to retain the contents of said weighing-receptacle from sliding off from said floor onto said chute, and said mixer being located at one side of said weighing-receptacle with its edge under the free end of said chute, whereby the material having been received by the weighing-receptacle and weighed may be allowed by the opening of the gate to slide by gravity laterally into said mixer, as and for the purposes described.

4. The combination of a frame, a series of bins held in elevated position by said frame, each bin having an outlet and a gate therefor, a rotary grading-screen above said bins having a plurality of grading-sections, each of which is connected with one of said bins to deliver graded ingredients thereto, and a weighing-receptacle located beneath the outlets to said bins, a mixer located on said frame at a lower level than said weighing-receptacle, and means for delivering the contents of said weighing-receptacle thereto, and means for delivering the contents of said mixer through its bottom, whereby the process of grading, proportioning, weighing, mixing, and delivering may be carried on, and gravity be relied upon to deliver the material after each step in the process to the mechanism for carrying on the next step, as set forth.

5. In combination, a frame, a mixer located above the base of said frame and having means for delivering its contents through its bottom, a weigher located on said frame and adapted to deliver its contents into said mixer, a series of bins located above said weigher and each adapted to discharge its contents into said weigher, and means adapted to grade material and deliver a separate grade to each bin, as described.

6. The combination in an apparatus of the character specified of a receiver and weigher, a mixer on a lower level and to which the contents of the former are adapted to be automatically delivered, a furnace and boiler for heating a composition, and a suspended bucket having a vertical movement with respect to the boiler and mixer.

7. In an apparatus for heating, grading and combining the mineral ingredients of a bituminous pavement, the combination of a drying and heating device adapted to dry and heat said mineral ingredients of the pavement as a whole, automatic means for separating said heated mineral ingredients into a number of different grades varying as to size, receptacles for receiving and holding said heated ingredients in their heated state, and a means common to all the receptacles for receiving and accurately and uniformly combining and mixing with a predetermined amount of heated bituminous composition the said heated ingredients.

8. In an apparatus of the character specified, the combination of devices for grading and holding graded ingredients, having a separate outlet for each grade of material, a mixer, an interposed weighing-receiver, a trolley-support above the mixer, a trolley mounted thereon, a bucket carried by the trolley vertically movable with respect to it, and a boiler or receptacle in operative relation to said bucket.

HORACE W. ASH.

Witnesses:
F. F. RAYMOND, 2d,
J. M. DOLAN.